US011132121B2

United States Patent
Fu et al.

(10) Patent No.: US 11,132,121 B2
(45) Date of Patent: Sep. 28, 2021

(54) METHOD, APPARATUS, STORAGE MEDIUM, AND ELECTRONIC DEVICE OF PROCESSING SPLIT SCREEN DISPLAY

(71) Applicant: GUANGDONG OPPO MOBILE TELECOMMUNICATIONS CORP., LTD., Guangdong (CN)

(72) Inventors: Liangjing Fu, Guangdong (CN); Tongxi Li, Guangdong (CN); Dan Cao, Guangdong (CN); Zhiyong Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/214,036

(22) Filed: Dec. 8, 2018

(65) Prior Publication Data

US 2019/0324635 A1 Oct. 24, 2019

(30) Foreign Application Priority Data

Apr. 19, 2018 (CN) .......................... 201810353206.0

(51) Int. Cl.
*G06F 3/0488* (2013.01)
*G09G 5/14* (2006.01)

(52) U.S. Cl.
CPC ........... *G06F 3/04883* (2013.01); *G09G 5/14* (2013.01); *G06F 2203/04803* (2013.01); *G09G 2354/00* (2013.01)

(58) Field of Classification Search
CPC ....... G06F 3/04883; G06F 2203/04803; G06F 2203/04808; G09G 5/14
See application file for complete search history.

(56) References Cited

U.S. PATENT DOCUMENTS 9,733,815 B2 * 8/2017 Xia ...................... G06F 3/04847
10,691,786 B1 * 6/2020 Park ........................ G06F 21/36
(Continued)

FOREIGN PATENT DOCUMENTS

| CN | 104035704 | 9/2014 |
| CN | 105389111 | 3/2016 |

(Continued)

OTHER PUBLICATIONS

WIPO, English Translation of ISR/WO for PCT/CN2019/074245, Apr. 18, 2019.

(Continued)

*Primary Examiner* — Phenuel S Salomon
(74) *Attorney, Agent, or Firm* — Hodgson Russ LLP

(57) ABSTRACT

The embodiment of the present application discloses a method, an apparatus, a storage medium, and an electronic device of processing split screen display. In the embodiment of the present application, gesture information on a display screen is acquired; when it is determined that the gesture information matches preset gesture information, position change information corresponding to the gesture information is acquired; when it is determined that the position change information matches preset position change information, a display region of the display screen is divided into at least two sub-regions; and a currently displayed first display interface is displayed in a first sub-region of the at least two sub-regions.

18 Claims, 5 Drawing Sheets

(56) References Cited

U.S. PATENT DOCUMENTS

| | | | |
|---|---|---|---|
| 2008/0168403 A1* | 7/2008 | Westerman | G06F 3/04883 715/863 |
| 2009/0249235 A1* | 10/2009 | Kim | G06F 3/04886 715/765 |
| 2010/0081475 A1* | 4/2010 | Chiang | G06F 3/0483 455/564 |
| 2011/0107272 A1* | 5/2011 | Aguilar | G06F 3/04883 715/853 |
| 2011/0175930 A1* | 7/2011 | Hwang | G06F 3/0488 345/629 |
| 2012/0176322 A1* | 7/2012 | Karmi | G06F 3/04883 345/173 |
| 2012/0240042 A1* | 9/2012 | Migos | G06F 3/017 715/702 |
| 2013/0346912 A1* | 12/2013 | Buening | G06F 3/0482 715/783 |
| 2014/0111451 A1* | 4/2014 | Park | G06F 3/04883 345/173 |
| 2014/0164966 A1* | 6/2014 | Kim | G06F 16/168 715/769 |
| 2015/0067588 A1* | 3/2015 | Shim | G06F 3/0481 715/790 |
| 2015/0100914 A1* | 4/2015 | Guan | G06F 3/04883 715/781 |
| 2015/0253937 A1* | 9/2015 | Kim | G06F 3/0488 715/765 |
| 2015/0365306 A1* | 12/2015 | Chaudhri | G06F 3/0416 715/736 |
| 2016/0046188 A1* | 2/2016 | Wild | G06F 3/0486 701/36 |
| 2016/0188151 A1* | 6/2016 | Xu | G06F 3/04842 715/863 |
| 2016/0210041 A1* | 7/2016 | Yang | G06F 3/0488 |
| 2016/0224145 A1* | 8/2016 | Harrison | G06F 3/043 |
| 2016/0224213 A1* | 8/2016 | Chen | G06F 3/017 |
| 2016/0328143 A1* | 11/2016 | Hu | G06F 3/04883 |
| 2016/0349851 A1* | 12/2016 | Eskolin | G06F 3/0483 |
| 2016/0378317 A1* | 12/2016 | Tian | G06K 9/00026 345/173 |
| 2016/0379598 A1* | 12/2016 | Nguyen | H04N 13/344 345/635 |
| 2017/0293421 A1* | 10/2017 | Xue | G06F 3/0482 |
| 2017/0357437 A1* | 12/2017 | Peterson | G06F 3/0486 |
| 2017/0357915 A1* | 12/2017 | Holmes | G06Q 10/02 |
| 2018/0052369 A1 | 2/2018 | Ko et al. | |
| 2018/0356972 A1* | 12/2018 | Wang | G06F 3/044 |
| 2019/0034073 A1* | 1/2019 | Shi | G06F 3/0481 |

FOREIGN PATENT DOCUMENTS

| | | |
|---|---|---|
| CN | 106101423 | 11/2016 |
| CN | 106293772 | 1/2017 |
| CN | 106502526 | 3/2017 |
| CN | 106527944 | 3/2017 |
| CN | 106681641 | 5/2017 |
| CN | 106775313 | 5/2017 |
| CN | 106843732 | 6/2017 |
| CN | 108632462 | 10/2018 |
| KR | 20170064334 | 6/2017 |

OTHER PUBLICATIONS

EPO, Office Action for EP Application No. 19150464, dated Jul. 1, 2019.
SIPO, Second Office Action in CN App. 201810353206.0, dated May 23, 2019, 13 pages (including translation).
SIPO, Rejection in CN App. 201810353206.0, Aug. 2, 2019, 11 pages (including translation).
IPI, Office Action for in Application No. 201914001788, dated Jan. 6, 2021.
EPO, Communication for EP Application No. 19150464.6, dated Jan. 20, 2021.

* cited by examiner

METHOD, APPARATUS, STORAGE MEDIUM, AND ELECTRONIC DEVICE OF PROCESSING SPLIT SCREEN DISPLAY

CROSS REFERENCE

The present application claims priority to Chinese Patent Application No. 201810353206.0, filed on Apr. 19, 2018, the entire disclosure of which is incorporated herein by reference.

TECHNICAL FIELD

The present disclosure relates to the field of electronic device technologies, and in particular, to a method, an apparatus, a storage medium, and an electronic device of processing split screen display.

BACKGROUND

As functions of electronic devices become more powerful, more and more applications can be operated on electronic devices, such as mobile phones. In many scenarios, the mobile phone may need to use a plurality of applications at the same time, and also need to display a plurality of applications on the display simultaneously. Therefore, a split screen function is required, to run a plurality of applications on a plurality of display regions on the display screen simultaneously.

At present, the mobile phone can provide a button that can trigger the split screen function. The user may trigger the split screen function by manually switching to a designated display interface and pressing the button that triggers the split screen function.

It should be noted that, information disclosed in the above background portion is provided only for better understanding of the background of the present disclosure, and thus it may contain information that does not form the prior art known by those ordinary skilled in the art.

SUMMARY

The embodiment of the present application provides a method, an apparatus, a storage medium, and an electronic device of processing split screen display.

In a first aspect, an embodiment of the present application provides a method of processing split screen display, applicable in an electronic device, and including:
acquiring gesture information on a display screen;
when it is determined that the gesture information matches preset gesture information, acquiring position change information corresponding to the gesture information;
when it is determined that the position change information matches preset position change information, acquiring a first display interface currently displayed by the display screen, and dividing a display region of the display screen into at least two sub-regions; and
displaying the first display interface in a first sub-region of the at least two sub-regions.

In a second aspect, an embodiment of the present application provides an apparatus of processing split screen display, including:
a first acquiring unit, configured to acquire gesture information on a display screen;
a second acquiring unit, configured to, when it is determined that the gesture information matches preset gesture information, acquire position change information corresponding to the gesture information;
a dividing unit, configured to, when it is determined that the position change information matches preset position change information, acquire a first display interface currently displayed by the display screen, and divide a display region of the display screen into at least two sub-regions; and
a display unit, configured to display the first display interface in a first sub-region of the at least two sub-regions.

In a third aspect, an embodiment of the present application provides a storage medium having a computer program stored thereon, when the computer program is run on a computer, the computer is configured to perform the method of processing the split screen display according to any embodiment of the present application.

In a fourth aspect, an embodiment of the present application provides an electronic device, including a processor and a memory, the memory having a computer program, wherein the processor is configured to execute the method of processing the split screen display according to any embodiment of the present application by invoking the computer program.

It is to be understood that both the foregoing general description and the following detailed description are exemplary and explanatory only and are not restrictive of the present disclosure.

This section provides a summary of various implementations or examples of the technology described in the disclosure, and is not a comprehensive disclosure of the full scope or all features of the disclosed technology.

BRIEF DESCRIPTION OF THE DRAWINGS

In order to more clearly illustrate the technical solutions in the embodiments of the present disclosure, the drawings used in the description of the embodiments will be briefly described below. It is obvious that the drawings in the following description are only some embodiments of the present disclosure. Other drawings can also be obtained based on these drawings by those skilled in the art without paying any creative effort.

DETAILED DESCRIPTION

Figure 1:
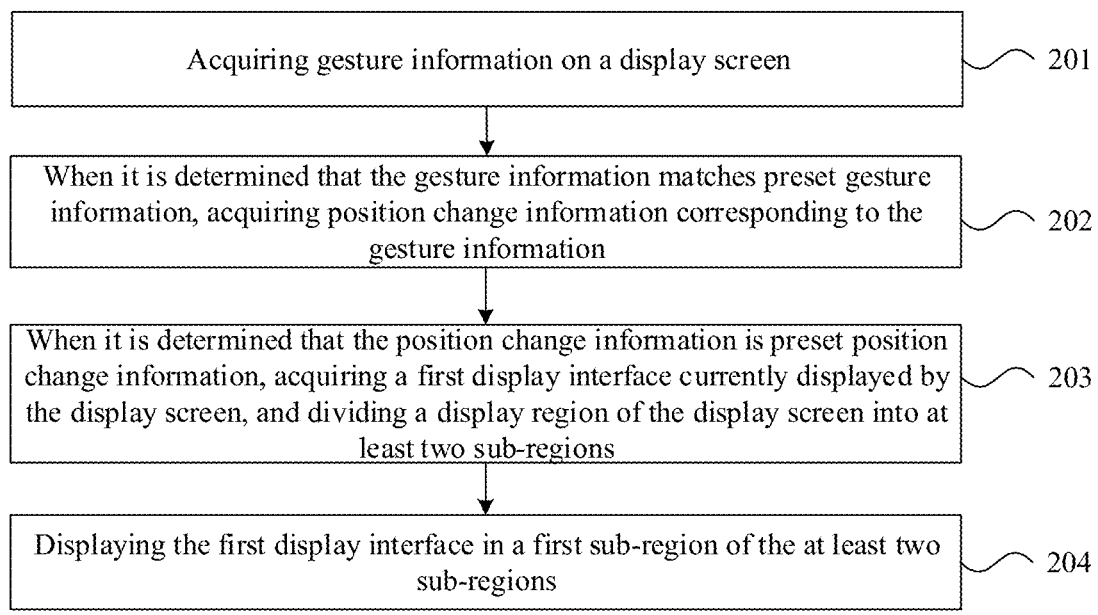
FIG. 1 is a schematic flowchart of a method of processing split screen display provided by an embodiment of the present application.

Referring to the drawings, like reference numerals represent like components, principles of the present application are illustrated by the implementation in a suitable computing environment. The following description is based on specific embodiments of the present disclosure as illustrated, and should not be construed as limiting the specific embodiments that are not described herein.

In the following description, specific embodiments of the present application will be described with reference to the steps and symbols executed by one or more computers, unless otherwise stated. Thus, throughout the description, these steps and operations will be described as being executed by a computer for several times. The computer execution referred to herein includes the operation of a computer processing unit that represents an electronic signal in data in a structured version. This operation converts the data or maintains it at a position in a memory system of the computer, which can be reconfigured or otherwise altered in a manner well known to those skilled in the art to change operation of the computer. The data structure maintained by the data is a physical position of the memory, which has specific characteristics defined by the data format. However, the principles of the present application are described in the above wording, which is not intended to be a limitation. Those skilled in the art will appreciate that various steps and operations described below can also be implemented in hardware.

The term "module" as used herein may be taken to mean a software object executed on the computing system. The different components, modules, engines, and services described herein can be considered as implementation objects on the computing system. The apparatus and method described herein may be implemented in software, and may of course be implemented in hardware, all of which are within the scope of the present application.

The terms "first", "second", and "third" and the like in this application are used to distinguish different objects, and are not intended to describe a particular order. Furthermore, the terms "include" and "have" and any variation thereof are intended to cover a non-exclusive inclusion. For example, a process, method, system, product, or device that includes a series of steps or modules is not limited to the listed steps or modules, but some embodiments also include steps or modules not listed, or some embodiments further includes other steps or modules inherent to these processes, methods, products or devices.

References to "an embodiment" herein mean that a particular feature, structure, or characteristic described in connection with the embodiments can be included in at least one embodiment of the present application. The appearances of the phrases in various places in the specification are not necessarily referring to the same embodiments, and are not independent or alternative embodiments that are mutually exclusive with other embodiments. Those skilled in the art will explicitly and implicitly understand that the embodiments described herein can be combined with other embodiments.

The embodiment of the present application provides a method of processing the split screen display, and the executor of the method of processing the split screen display may be an apparatus of processing split screen display provided by the embodiment of the present application, or an electronic device integrated with the apparatus of processing split screen display. The apparatus of processing split screen display can be implemented by hardware or software. The electronic device may be a device such as a smart phone, a tablet computer, a palmtop computer, a notebook computer, a desktop computer, or the like.

Please refer to FIG. 1, which is a schematic flowchart of a method of processing split screen display provided by an embodiment of the present application. The specific process of the method of processing split screen display provided by the embodiment of the present application may be as follows.

In step 201, gesture information on a display screen is acquired.

The display screen can be a capacitive touch screen, and the capacitive touch screen technology is operated by utilizing the current sensing of the human body. The capacitive touch screen is a four-layer composite glass screen. Each of an inner surface and interlayer of the glass screen is coated with a layer of indium tin oxide (ITO), and the outermost layer thereof is a thin layer of silicon glass protective layer. The interlayered ITO coating is served as a working surface, and four electrodes are led out at four corners, and the inner layer of ITO is a shielding layer to ensure a good working environment. When a finger touches the metal layer, a coupling capacitor is formed between the user and the surface of the touch screen due to the electric field of the human body. As for high-frequency current, the capacitor is a direct conductor, and thus the finger sucks a small current from the contact point. This current flows out from the electrodes on the four corners of the touch screen, and the current flowing through the four electrodes is proportional to a distance from the finger to the four corners. The controller accurately calculates the ratio of the four currents, to obtain the position of the touch point.

In an embodiment, the capacitive touch screen can implement multi-touch, specifically by increasing electrodes of mutual capacitance. In short, the screen is divided into blocks, and each set of mutual capacitance modules is independently operated in each region. Therefore, the capacitive screen can independently detect the touch situation of each region, and multi-touch is simply implemented after processing.

Further, the gesture information of the user may be acquired through the capacitive touch screen. The user can perform any gesture operation on the capacitive touch screen, for example, a single-finger click operation, a two-finger click operation, a three-finger click operation, and the like. The capacitive touch screen can acquire data generated when the user's finger clicks the touch screen through the electrode, to generate gesture information.

In some embodiments, the step of acquiring gesture information on the display screen may include:

(1) acquiring a click touch operation of a user on the display screen through the display screen;

(2) analyzing the click touch operation to determine point touch data corresponding to the click touch operation; and (3) generating gesture information according to the touch data.

The display screen may acquire the click touch operation of the user on the display through the electrode. The click touch operation can be a single touch operation, a two-touch operation or a three-touch operation, or the like. It should be noted that when the user clicks with a single finger, a single-point touch operation is generated; when the user clicks with two fingers, a two-point touch operation is generated; and when the user clicks with three fingers, a three-point touch operation is generated, and so on.

Further, when the display screen acquires the touch operation through the electrode, a specific current magnitude of each point is analyzed, position coordinate information of each point is determined, the point touch data is determined, and the gesture information is generated according to the point touch data.

In step 202, when it is determined that the gesture information matches preset gesture information, position change information corresponding to the gesture information is acquired.

When it is determined that the gesture information matches the preset gesture information, is indicates that the gesture input by the user is a preset gesture. For example, if the gesture information indicates a three-touch operation, and the preset gesture information also indicates a three-touch operation, then it is determined that the gesture information matches the preset gesture information, and position change information corresponding to the gesture information is obtained through the display screen.

It should be noted that, the user can also perform a sliding touch operation on the display screen in addition to performing the click touch operation on the display screen. When the user slides on the display screen with a certain gesture, a position coordinate of the gesture acquired by the electrode on the display screen will change accordingly. The electronic device generates position change information according to the change, and can determine a sliding direction of the gesture according to the position change information. For example, the sliding motion is an upward sliding motion, a downward sliding motion, a leftward sliding motion, and a rightward sliding motion.

In some implementations, the step of acquiring position change information corresponding to the gesture information may include:

(1) acquiring a sliding touch operation of a user on the display screen through the display screen;

(2) analyzing the sliding touch operation to determine sliding touch data corresponding to the sliding touch operation; and (3) generating position change information according to the sliding touch data.

The sliding touch operation of the user on the display screen is obtained by the electrode on the display screen. When the user's finger slides on the display screen, the position coordinates of the finger obtained by the electrode change correspondingly, and the electronic device determines corresponding sliding touch data according to the position coordinates, and generates position change information according to the sliding touch data.

In step 203, when it is determined that the position change information matches preset position change information, a first display interface currently displayed by the display screen is acquired, and a display region of the display screen is divided into at least two sub-regions.

When it is determined that the gesture information matches the preset gesture information, it indicates that the gesture input by the user matches a preset gesture. For example, if the gesture information indicates a three-touch operation, and the preset gesture information also indicates a three-touch operation, then it is determined that the gesture information is the preset gesture information, and position change information corresponding to the gesture information is obtained through the display screen. When it is determined that the position change information matches also the preset position change information, it indicates that the sliding motion input by the user based on the gesture is a preset sliding motion. If the position change information is indicated as the upward sliding motion and the preset position change information is also indicated as the upward sliding motion, it is determined that the position change information matches the preset position change information.

The display region of the existing electronic device is generally a whole region of the display screen. Although the electronic device can run a plurality of applications at the same time, only one application can be displayed on the entire region at a particular time. If other applications are needed, switching must be performed, and the process is complicated.

Further, the electronic device obtains the currently displayed first display interface. The first display interface may be a desktop display interface of the electronic device, or may be a display interface of a specific application, such as a video display interface of a video application, or a chat display interface of a chat application. At the same time, the display region of the display screen is divided into at least two sub-regions, and contents of the at least two sub-regions can be simultaneously operated. The user can select any one of the sub-regions as the focus region to operate as needed.

In step 204, the first display interface is displayed in a first sub-region of the at least two sub-regions.

The electronic device may display the content of the first display interface in the first sub-region of the at least two sub-regions. In an embodiment, the first sub-region is a sub-region near the top of the display screen. At the same time, the electronic device acquires an icon of another application, and displays the icon in the second sub-region. The user can select an application therein as needed. When the user confirms an icon, the electronic device acquires the display interface of the application corresponding to the icon, and displays the display interface in the second sub-region. By analogy, when there is further a third sub-region, the split screen processing is performed in the above manner.

In some embodiments, the step of displaying the first display interface in a first sub-region of the at least two sub-regions may include:

(1) displaying the first display interface in the first sub-region;

(2) displaying an icon of at least one application according to a usage frequency in an order from high to low; and (3) when a selection instruction of the icon by the user is received, displaying a second display interface of the application corresponding to the selected icon in a second sub-region of the at least two sub-regions.

The electronic device displays the first display interface in the first sub-region, and simultaneously acquires a plurality of applications on the electronic device. The plurality of applications is arranged in the second sub-region according to the commonly used frequency or the split screen processing frequency from high to low. The user can select according to the icons of the arranged applications. When the selection instruction for the icon from the user is received, the second display interface of the application corresponding to the selected icon is displayed in the second sub-region, and so on. When there is a third sub-region, the split screen processing is performed in the above manner.

In an embodiment, the first display interface is displayed in the first sub-region, and thumbnails of the plurality of applications may be displayed in the second sub-region according to the usage frequency in an order from high to low. The user may select a thumbnail and displays a program interface of the application corresponding to the thumbnail on the second sub-region.

It can be seen that, in the embodiment of the present application, gesture information on a display screen is acquired; when it is determined that the gesture information matches preset gesture information, position change information corresponding to the gesture information is acquired; when it is determined that the position change information matches preset position change information, a first display interface currently displayed by the display screen is acquired, and a display region of the display screen is divided into at least two sub-regions; and the first display interface is displayed in a first sub-region of the at least two sub-regions. In this way, a user can quickly realize a split screen display function of a display screen by coordinating a gesture position change with a specific gesture, which greatly improves a processing efficiency of the split screen display.

Figure 2:
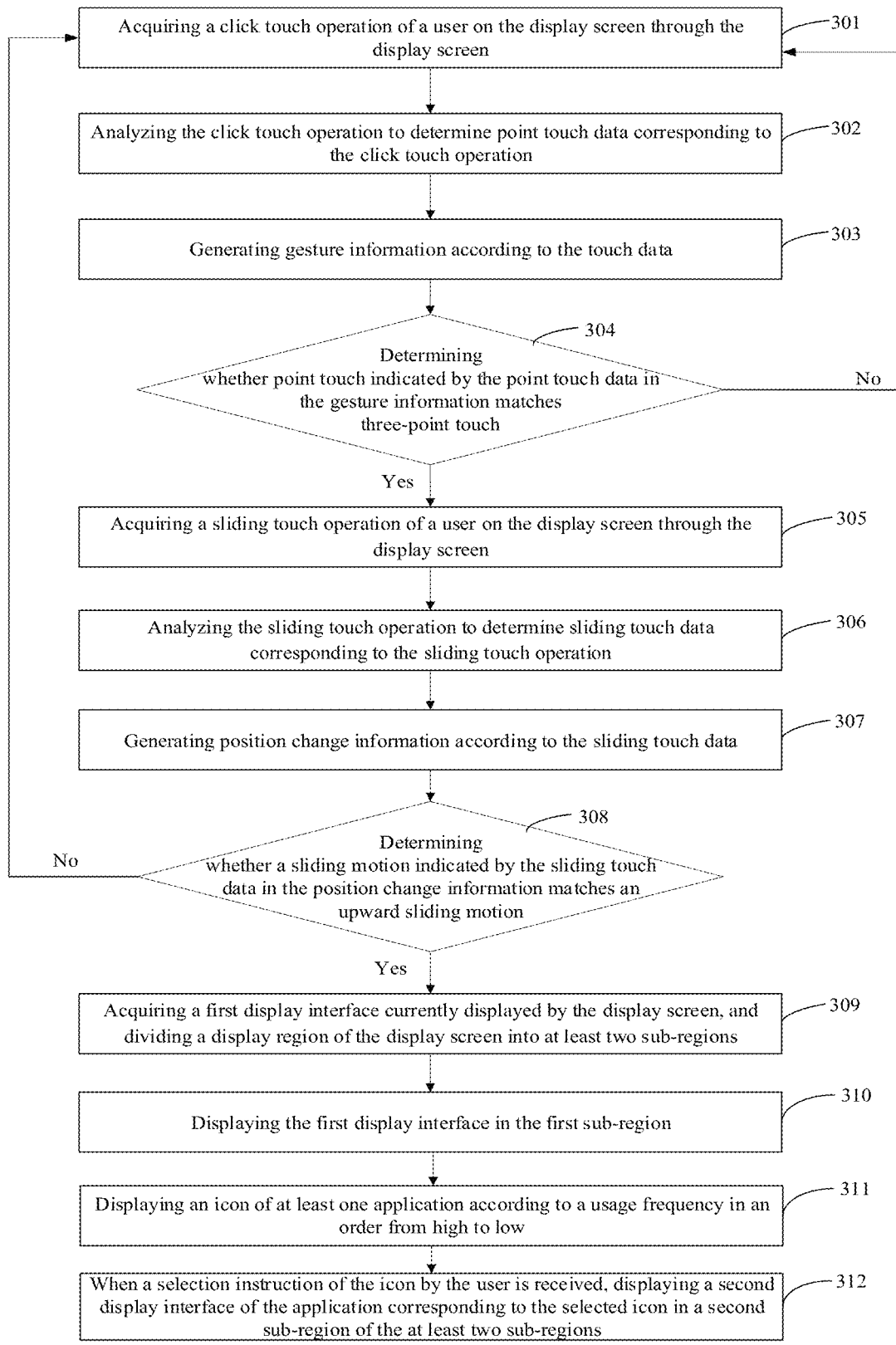
FIG. 2 is another schematic flowchart of a method of processing split screen display provided by an embodiment of the present application.

The display method of the present application will be further described below based on the method described in the above embodiments. Referring to FIG. 2, the method of processing the split screen display may include following steps.

In step 301, a click touch operation of a user on the display screen is acquired through the display screen.

The display screen can be a capacitive touch screen, so the electronic device can obtain the click touch operation of the user on the display through the display screen. For example, when the user touches on the display screen with a single finger, it is a single-point touch. When the user touches on the display with two fingers, it is a two-point touch operation. When the user touches on the display with three fingers, it is a three-point touch operation, and the like.

Figure 3A:
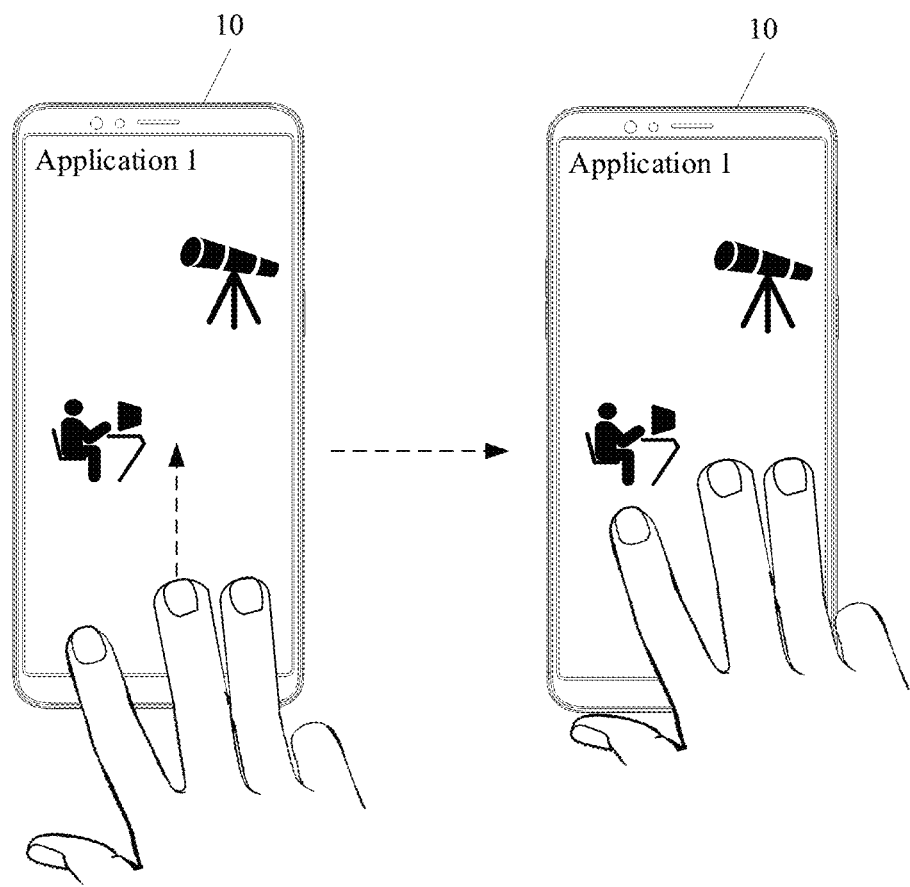
FIG. 3a is a schematic diagram of a scenario of split screen processing according to an embodiment of the present application.

As shown in FIG. 3a, when the user performs a click touch operation on the display screen of the electronic device 10 through an index finger, a middle finger and a ring finger, the display screen can sense and acquire the click touch operation.

In step 302, the click touch operation is analyzed to determine point touch data corresponding to the click touch operation.

The display screen senses the click touch operation of the user through the current change on the electrode, and determines a position coordinate corresponding to each touch point, and determines point touch data corresponding to the touch operation according to the position coordinate corresponding to each touch point.

In step 303, gesture information is generated according to the touch data.

The electronic device generates gesture information according to the determined point touch data. The gesture information may indicate the user to click the touch position information and the touch point information corresponding to the touch operation on the display screen.

In step 304, it is determined whether point touch indicated by the point touch data in the gesture information matches three-point touch.

When it is determined that the point touch indicated by the point touch data in the gesture information matches three-point touch, step 305 is performed; when it is determined that the point touch indicated by the point touch data in the gesture information does not match three-point touch, the first-step verification condition is not satisfied, and the process returns to step 301 to retrieve the click touch operation of the user on the display screen through the display screen.

In step 305, a sliding touch operation of a user on the display screen is acquired through the display screen.

When it is determined that the point touch indicated by the point touch data in the gesture information matches a three-point touch, it indicates that the gesture motion input by the user is a three-finger touch motion, and the first-step verification condition is met. The electronic device acquires the sliding touch operation of the user on the display screen through the display screen. For example, when the user slides up on the display screen with the above gesture motion, it is an upward sliding motion. When the user slides down on the display screen with the above gesture motion, it is a downward sliding motion. When the user performs left sliding on the display screen with the above gesture motion, it is a leftward sliding motion. When the user performs right slide on the display screen with the above gesture motion, it is a rightward sliding motion.

As shown in FIG. 3a, after performing a click touch operation on the display screen of the electronic device 10 through the index finger, the middle finger, and the ring finger at the same time, the user slides upward toward the upper end of the electronic device 10, and the display screen can sense and acquire the upward sliding touch operation.

In step 306, the sliding touch operation is analyzed to determine sliding touch data corresponding to the sliding touch operation.

The display screen can sense the sliding touch operation of the user through the current change on the electrode, and can sense the position coordinate change data corresponding to the touch point according to a trend of the current change, and determine sliding touch data corresponding to the sliding touch operation according to the position coordinate change data.

In step 307, position change information is generated according to the sliding touch data.

The electronic device generates position change information according to the determined sliding touch data. The position change information may indicate position coordinate change information of the corresponding touch point and a sliding direction of the gesture motion of the user on the display screen.

In step 308, it is determined whether a sliding motion indicated by the sliding touch data in the position change information matches an upward sliding motion.

When it is determined that the sliding motion indicated by the sliding touch data in the position change information matches an upward sliding motion, step 309 is performed; when it is determined that the sliding motion indicated by the sliding touch data in the position change information does not match an upward sliding motion, the second-step verification condition is not met, the process returns to step 301 to retrieve the click touch operation of the user on the display screen through the display screen.

In step 309, a first display interface currently displayed by the display screen is acquired, and a display region of the display screen is divided into at least two sub-regions.

When it is determined that the sliding motion indicated by the sliding touch data in the position change information matches an upward sliding motion, it indicates that the sliding motion input by the user is an upward sliding motion, the second-step verification condition is satisfied. That is, through the double verification of the three-finger click and upward sliding motion, the split screen mode is enabled. The electronic device correspondingly obtains the first display interface currently displayed on the display screen, and divides the display region of the display screen into at least two sub-regions. The contents of the at least two sub-regions can be simultaneously run, the user can select any of the sub-regions as the focus region to operate according to needs.

As shown in FIG. 3a, when the electronic device 10 determines that the sliding motion indicated by the sliding touch data in the position change information matches an upward sliding motion, the electronic device 10 acquires an application display interface of the application 1 currently displayed on the display screen. Continuing to refer to FIG. 3b, the electronic device 10 divides the display region of the display screen into the first sub-region 11 and the second sub-region 12.

In step 310, the first display interface is displayed in the first sub-region.

The electronic device displays the acquired first display interface in the first sub-region. In an embodiment, the first sub-region is a sub-region near the top of the electronic device.

Figure 3B:
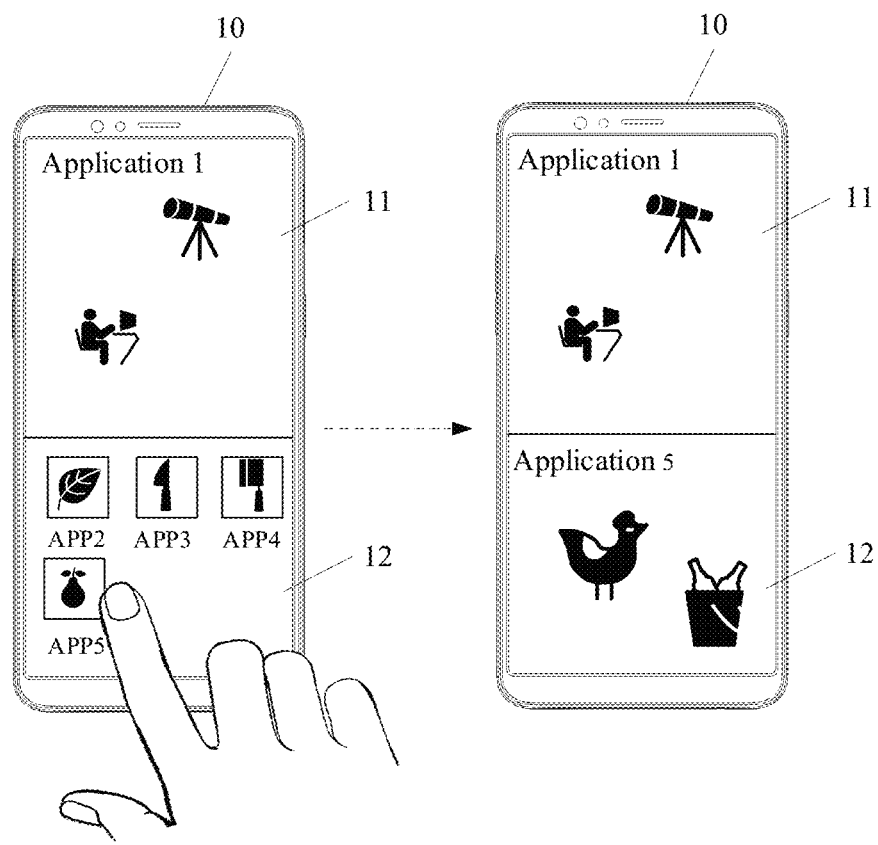
FIG. 3b is another schematic diagram of a scenario of split screen processing according to an embodiment of the present application.

As shown in FIG. 3b, the electronic device 10 displays the acquired application display interface of the currently displayed application 1 on the first sub-region 11, and the user can manipulate the application 1 on the first sub-region 11.

In step 311, an icon of at least one application is displayed according to a usage frequency in an order from high to low.

The icon of the application on the electronic device can be acquired, and the usage frequency of each application is acquired at the same time, and the icons of the applications are ranked and displayed according to the usage frequency in the order from high to low.

As shown in FIG. 3b, the electronic device acquires the application 2, the application 3, the application 4, and the application 5, and simultaneously acquires the usage frequency of each application, and ranks the application 2, the application 3, and the application 4 and the application 5 according to the usage frequency in the order from high to low and displays the same in the second sub-region 12.

In step 312, when a selection instruction of the icon by the user is received, a second display interface of the application corresponding to the selected icon is displayed in a second sub-region of the at least two sub-regions.

The user can select the displayed icons according to the split screen requirement. When the selection instruction of the icon by the user is received, the electronic device displays the second display interface of the application corresponding to the selected icon in the second sub-region of the at least two sub-regions.

In an embodiment, when the application corresponding to the selected icon is already running in the background, the current display interface of the application may be directly displayed in the second sub-region of the at least two sub-regions from the background. When the application corresponding to the selected icon is not running in the background, the application is directly launched, and the display interface of the launched application is displayed in at least two sub-regions.

As shown in FIG. 3b, the user selects the application 5 according to the split screen requirement, and the electronic device 10 displays the display interface corresponding to the selected application 5 in the second sub-region 12.

As can be seen from the above, in the embodiment of the present application, a click touch operation of a user on the display screen is acquired through the display screen and verification is performed. When the click touch operation is verified as a three-finger touch operation, the display screen acquires the sliding touch operation of the user on the display screen to perform verification. When the sliding touch operation is verified as the upward sliding motion, the display region of the display screen is divided into at least two sub-regions, and the first display interface currently displayed on the display screen is displayed in the first sub-region of the at least two sub-regions, and the second display interface corresponding to the application selected by the user is displayed in the second sub-region of the at least two sub-regions. In this way, the user can quickly achieve the split screen display function of the display screen by coordinating a specific number of finger clicks and a specific sliding direction, thereby greatly improving the processing efficiency of the split screen display.

Figure 4:
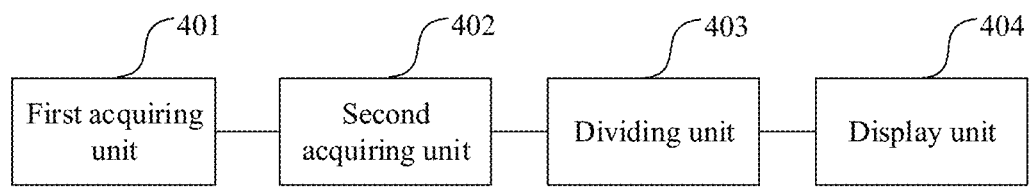
FIG. 4 is a schematic structural diagram of an apparatus of processing split screen display according to an embodiment of the present application.

In an embodiment, an apparatus of processing split screen display is further provided. Please refer to FIG. 4, which is a schematic structural diagram of an apparatus of processing split screen display according to an embodiment of the present application. The apparatus of processing split screen display is applied to an electronic device and includes a first acquiring unit 401, a second acquiring unit 402, a dividing unit 403, and a display unit 404.

The first acquiring unit 401 is configured to acquire gesture information on a display screen.

The first acquiring unit 401 can acquire the gesture information of the user through the capacitive touch screen. The user can perform any gesture operation on the capacitive touch screen, for example, a single-finger click operation, a two-finger click operation, a three-finger click operation, and the like. The capacitive touch screen can acquire data generated when the user's finger clicks the touch screen through the electrode, to generate gesture information.

The second acquiring unit 402 is configured to configured to, when it is determined that the gesture information is preset gesture information, acquire position change information corresponding to the gesture information.

When the second acquisition unit 402 determines that the gesture information matches the preset gesture information, is indicates that the gesture input by the user is a preset gesture. For example, if the gesture information indicates a three-touch operation, and the preset gesture information also indicates a three-touch operation, then it is determined that the gesture information matches the preset gesture information, and position change information corresponding to the gesture information is obtained through the display screen.

The dividing unit 403 is configured to, when it is determined that the position change information matches preset position change information, acquire a first display interface currently displayed by the display screen, and divide a display region of the display screen into at least two sub-regions.

When the second acquiring unit 402 determines that the gesture information matches the preset gesture information, it indicates that the gesture input by the user is a preset gesture. For example, if the gesture information indicates a three-touch operation, and the preset gesture information also indicates a three-touch operation, then it is determined that the gesture information matches the preset gesture information, and position change information corresponding to the gesture information is obtained through the display screen. When dividing unit 403 determines that the position change information matches also the preset position change information, it indicates that the sliding motion input by the user based on the gesture is a preset sliding motion. If the position change information is indicated as the upward sliding motion and the preset position change information is also indicated as the upward sliding motion, it is determined that the position change information matches the preset position change information.

Further, the dividing unit 403 obtains the currently displayed first display interface. The first display interface may be a desktop display interface of the electronic device, or may be a display interface of a specific application, such as a video display interface of a video application, or a chat display interface of the chat application. At the same time, the display region of the display screen is divided into at least two sub-regions, and contents of the at least two sub-regions can be simultaneously operated. The user can select any one of the sub-regions as the focus region to operate as needed.

The display unit 404 is configured to display the first display interface in a first sub-region of the at least two sub-regions.

The display unit 404 may display the content of the first display interface in the first sub-region of the at least two sub-regions. In an embodiment, the first sub-region is a sub-region near the top of the display screen. At the same time, the electronic device acquires an icon of another application, and displays the icon in the second sub-region. The user can select an application therein as needed. When the user determines an icon, the electronic device acquires the display interface of the application corresponding to the icon, and displays the display interface in the second sub-region. By analogy, when there is further a third sub-region, the split screen processing is performed in the above manner.

Figure 5:
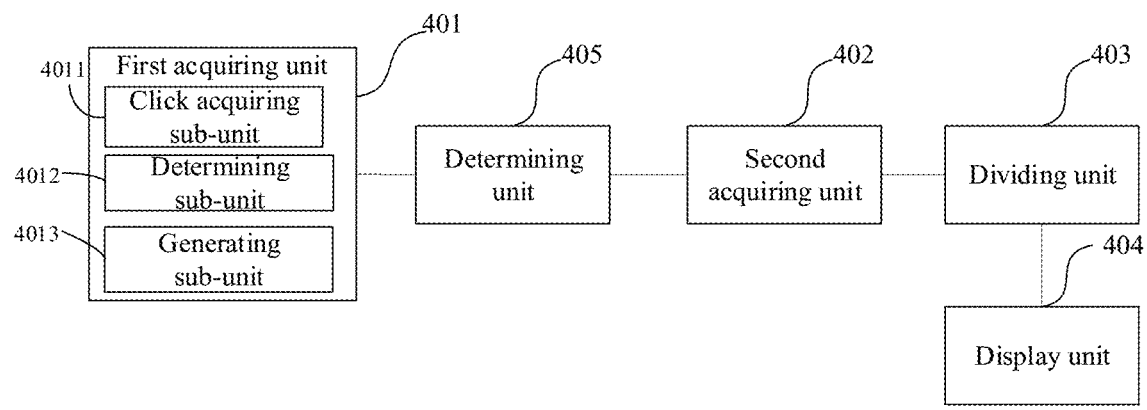
FIG. 5 is another schematic structural diagram of an apparatus of processing split screen display according to an embodiment of the present application.

In an embodiment, referring to FIG. 5, the first acquiring unit 401 may include:

a click acquiring sub-unit 4011, configured to acquire a click touch operation of a user on the display screen through the display screen;

a determining sub-unit 4012, configured to analyze the click touch operation to determine point touch data corresponding to the click touch operation; and a generating sub-unit 4013, configured to generate gesture information according to the touch data.

In an embodiment, referring to FIG. 5, the apparatus of processing the split screen display may further include:

a determining unit 405, configured to determine whether point touch indicated by the point touch data in the gesture information matches three-point touch;

the second acquiring unit 402, specifically further configured to, when it is determined that the point touch indicated by the point touch data in the gesture information matches the three-point touch, determine that the gesture information matches the preset gesture information and perform the step of acquiring position change information corresponding to the gesture information.

The steps performed by the units in the apparatus of processing the split screen display may refer to the method steps described in the foregoing method embodiments. The apparatus of processing the split screen display can be integrated in an electronic device, such as a mobile phone, a tablet computer, or the like.

In the specific implementation, the foregoing various units may be implemented as an independent entity, and may be implemented in any combination, and may be implemented as the same entity or a plurality of entities. The specific implementation of the foregoing units may refer to the foregoing embodiments, and details are not described herein again.

It can be seen that in the apparatus of processing split screen display, the first acquiring unit 401 is configured to acquire gesture information on a display screen; when the second acquiring unit 402 determines that the gesture information matches preset gesture information, position change information corresponding to the gesture information is acquired; when the dividing unit 403 determines that the position change information matches preset position change information, a first display interface currently displayed by the display screen is acquired, and a display region of the display screen is divided into at least two sub-regions; and the display unit 404 is configured to display the first display interface in a first sub-region of the at least two sub-regions.

In this way, a user can coordinate a gesture position change with a specific gesture, and quickly realize a split screen display function of a display screen, which greatly improves a processing efficiency of the split screen display.

Figure 6:
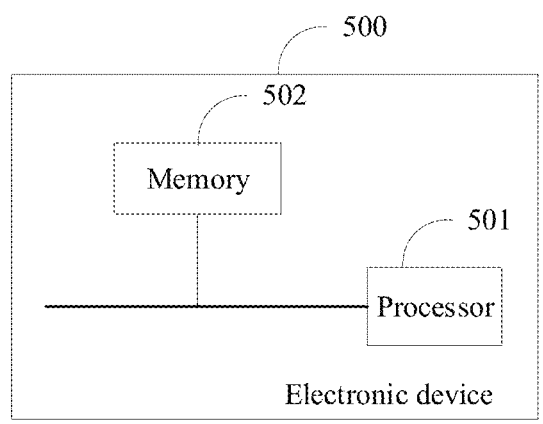
FIG. 6 is a schematic structural diagram of an electronic device according to an embodiment of the present application.

An embodiment of the present application further provides an electronic device. Referring to FIG. 6, the electronic device 500 includes a processor 501 and a memory 502. The processor 501 is electrically connected to the memory 502.

The processor 500 is a control center of the electronic device 500, which connects various parts of the entire electronic device using various interfaces and circuits. The processor 500 executes various functions of the electronic device 500 and processes of the data by running or loading computer programs stored in the memory 502 and invoking data stored in the memory 502, to perform overall monitoring of the electronic device 500.

The memory 502 can be used to store software programs and modules, and the processor 501 executes various functional applications and data processing by running computer programs and modules stored in the memory 502. The memory 502 can mainly include a storage program area and a storage data area, wherein the storage program area can store an operating system, a computer program required for at least one function (such as a sound playing function, an image playing function, etc.), and the like; the storage data area can store data created according to the use of electronic devices, etc. Moreover, memory 502 can include high speed random access memory, and can also include non-volatile memory, such as at least one magnetic disk storage device, flash memory device, or other volatile solid state storage device. Accordingly, memory 502 can also include a memory controller, to provide access to memory 502 by the processor 501.

In the embodiment of the present application, the processor 501 in the electronic device 500 loads instructions corresponding to processes of one or more computer programs into the memory 502 according to following steps, and runs computer programs stored in the memory 502, to achieve various functions, as follows:

acquiring gesture information on a display screen;

when it is determined that the gesture information matches preset gesture information, acquiring position change information corresponding to the gesture information;

when it is determined that the position change information matches preset position change information, acquiring a first display interface currently displayed by the display screen, and dividing a display region of the display screen into at least two sub-regions; and displaying the first display interface in a first sub-region of the at least two sub-regions.

In some embodiments, when gesture information on the display screen is acquired, the processor 501 may specifically perform following steps:

acquiring a click touch operation of a user on the display screen through the display screen;

analyzing the click touch operation to determine point touch data corresponding to the click touch operation; and generating gesture information according to the touch data.

In some embodiments, before acquiring position change information corresponding to the gesture information, the processor 501 may further perform the following steps:

determining whether point touch indicated by the point touch data in the gesture information matches three-point touch; and when it is determined that the point touch indicated by the point touch data in the gesture information matches the three-point touch, determining that the gesture information matches the preset gesture information and performing the step of acquiring position change information corresponding to the gesture information.

In some embodiments, when position change information corresponding to the gesture information is acquired, the processor 501 may specifically perform the following steps:

acquiring a sliding touch operation of a user on the display screen through the display screen;

analyzing the sliding touch operation to determine sliding touch data corresponding to the sliding touch operation; and generating position change information according to the sliding touch data.

In some embodiments, before acquiring the first display interface currently displayed by the display screen, the processor 501 may further perform the following steps:

determining whether a sliding motion indicated by the sliding touch data in the position change information matches an upward sliding motion; and when it is determined that the sliding motion indicated by the sliding touch data in the position change information matches the upward sliding motion, determining that the position change information matches the preset position change information and performing the step of acquiring a first display interface currently displayed by the display screen.

In some embodiments, when the first display interface is displayed in a first sub-region of the at least two sub-regions, the processor 501 may specifically perform the following steps:

displaying the first display interface in the first sub-region;

displaying an icon of at least one application according to a usage frequency in an order from high to low; and when a selection instruction of the icon by the user is received, displaying a second display interface of the application corresponding to the selected icon in a second sub-region of the at least two sub-regions.

As seen from above, in the electronic device of the embodiment of the present application, gesture information on a display screen is acquired; when it is determined that the gesture information matches preset gesture information, position change information corresponding to the gesture information is acquired; when it is determined that the position change information matches preset position change information, a first display interface currently displayed by the display screen is acquired, and a display region of the display screen is divided into at least two sub-regions; and the first display interface is displayed in a first sub-region of the at least two sub-regions. In this way, a user can coordinate a gesture position change with a specific gesture, and quickly realize a split screen display function of a display screen, which greatly improves a processing efficiency of the split screen display.

Figure 7:
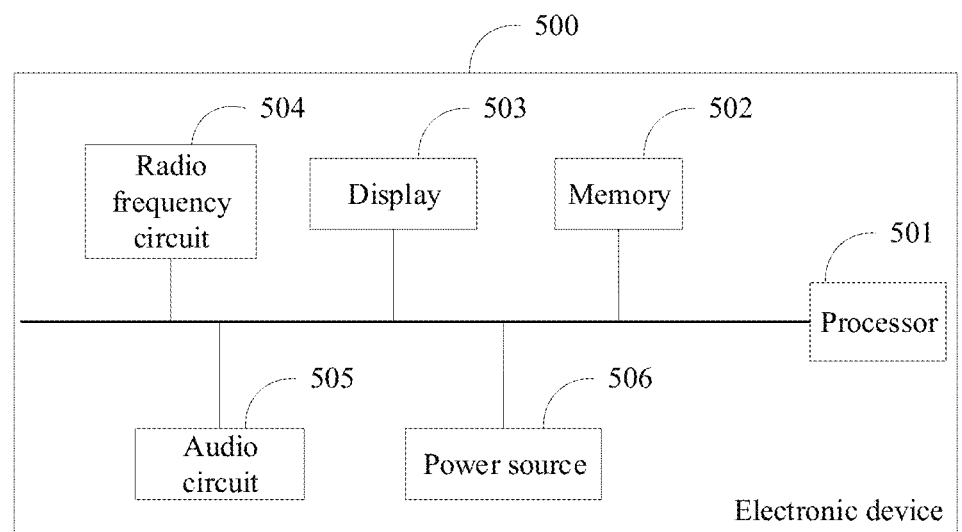
FIG. 7 is another schematic structural diagram of an electronic device according to an embodiment of the present application.

Referring to FIG. 7 together, in some embodiments, the electronic device 500 may further include: a display 503, a radio frequency circuit 504, an audio circuit 505, and a power source 506. The display 503, the radio frequency circuit 504, the audio circuit 505, and the power source 506 are electrically connected to the processor 501, respectively.

The display 503 can be used to display information input by a user or information provided to a user, as well as various graphical user interfaces. These graphical user interfaces can be composed of graphics, text, icons, video, and any combination thereof. The display 503 can include a display panel. In some embodiments, the display panel can be configured in the form of a liquid crystal display (LCD), or an organic light-emitting diode (OLED).

The radio frequency circuit 504 can be used to transmit and receive radio frequency signals, to establish wireless communication with network devices or other electronic devices through wireless communication, and to transmit and receive signals with network devices or other electronic devices.

The audio circuit 505 can be used to provide an audio interface between the user and the electronic device through a speaker or a microphone.

The power source 506 can be used to power various components of the electronic device 500. In some embodiments, the power supply 506 can be logically coupled to the processor 501 through a power management system, to achieve functions such as managing charging, discharging, and power management through the power management system.

Although not shown in FIG. 7, the electronic device 500 may further include a camera, a Bluetooth module, and the like, and details are not described herein.

The embodiment of the present application further provides a storage medium, where the computer program stores a computer program, and when the computer program runs on the computer, the computer is caused to execute a method of processing split screen display in any of above embodiments, for example: acquiring gesture information on a display screen; when it is determined that the gesture information matches preset gesture information, acquiring position change information corresponding to the gesture information; when it is determined that the position change information matches preset position change information, acquiring a first display interface currently displayed by the display screen, and dividing a display region of the display screen into at least two sub-regions; and displaying the first display interface in a first sub-region of the at least two sub-regions.

In the embodiment of the present application, the storage medium may be a magnetic disk, an optical disk, a read only memory (ROM), or a random access memory (RAM), or the like.

In the above embodiments, the descriptions of the various embodiments are all focused on their own emphases, and the parts that are not detailed in a certain embodiment can be referred to the related descriptions of other embodiments.

It should be noted that, in the method of processing split screen display of the embodiment of the present application, those skilled in the art can understand all or part of the processes of implementing the method of processing split screen display of the embodiment of the present application, which can be implemented by a computer program controlling related hardware. The computer program may be stored in a computer readable storage medium, such as in a memory of the electronic device, and executed by at least one processor in the electronic device, during execution, it may include a process of an embodiment of a method of processing split screen display. The storage medium may be a magnetic disk, an optical disk, a read only memory, a random access memory, or the like.

As for the apparatus of processing split screen display of the embodiment of the present application, each functional module may be integrated into one processing chip, or each module may be physically separated, or two or more modules may be integrated into one module. The above integrated modules can be implemented in the form of hardware or in the form of software functional modules. The integrated module, if implemented in the form of a software functional module and sold or used as an individual product, may also be stored in a computer readable storage medium, such as a read only memory, a magnetic disk or an optical disk, etc.

The method, apparatus, storage medium, and electronic device of processing split screen display provided by the embodiments of the present application are described in detail. The principles and implementation manners of the present application are described by applying specific examples in the application. The descriptions of above embodiments are only used to help understanding the method of the present application and its core ideas; at the same time, for those skilled in the art, according to the idea of the present application, there will be changes in the specific embodiments and application scopes. Above all, the contents of this specification are not to be construed as limiting the present application.

What is claimed is:

1. A method of processing split screen display, applicable in an electronic device, and comprising:
   acquiring, by a display screen, gesture information on the display screen, wherein the gesture information is a pattern of a user's touch on the display screen;
   sending the gesture information to a processor of the electronic device;
   in response to determining by the processor that the gesture information matches preset gesture information, acquiring position change information corresponding to the gesture information, wherein the position change information is a change of touch position of the pattern;
   in response to determining by the processor that the position change information matches preset position change information, dividing a display region of the display screen into at least two sub-regions during the pattern of the user's touch on the display screen; and
   displaying a currently displayed first display interface in a first sub-region of the at least two sub-regions;
   wherein the preset gesture information matches a three-point touch, and the preset position change information matches an upward sliding motion.

2. The method of processing the split screen display according to claim 1, wherein the step of acquiring gesture information on a display screen comprises:
   acquiring a click touch operation of a user on the display screen;
   analyzing the click touch operation to determine point touch data corresponding to the click touch operation; and
   generating the gesture information according to the point touch data.

3. The method of processing the split screen display according to claim 2, wherein the acquiring a click touch operation of a user on the display screen comprises:
   acquiring, by an electrode in the display screen, the click touch operation of the user; and
   when the display screen acquires the touch operation through the electrode, analyzing, by the processor, a current magnitude of each point, and determining position coordinate information of each point.

4. The method of processing the split screen display according to claim 3, wherein the analyzing the click touch operation to determine point touch data corresponding to the click touch operation comprises:
determine point touch data corresponding to the click touch operation according to the position coordinate information of each point.

5. The method of processing the split screen display according to claim 1, wherein the step of acquiring position change information corresponding to the gesture information comprises:
   acquiring a sliding touch operation of a user on the display screen;
   analyzing the sliding touch operation to determine sliding touch data corresponding to the sliding touch operation; and
   generating the position change information according to the sliding touch data.

6. The method of processing the split screen display according to claim 5, wherein the step of dividing a display region of the display screen into at least two sub-regions:
   determining whether a sliding motion indicated by the sliding touch data in the position change information matches the upward sliding motion; and
   when it is determined that the sliding motion indicated by the sliding touch data in the position change information matches the upward sliding motion, determining that the position change information matches the preset position change information and performing the step of dividing a display region of the display screen into at least two sub-regions.

7. The method of processing the split screen display according to claim 6, wherein the step of displaying a currently displayed first display interface in a first sub-region of the at least two sub-regions comprises:
   displaying the first display interface in the first sub-region;
   displaying an icon or a thumbnail of at least one application according to a usage frequency in an order from high to low; and
   when a selection instruction of the icon by the user is received, displaying a second display interface of the application corresponding to the selected icon in a second sub-region of the at least two sub-regions.

8. An electronic device, comprising:
   a processor; and
   a memory, the memory having a computer program,
   wherein the processor is configured to execute a method of processing the split screen display by invoking the computer program, and wherein the method comprises:
   acquiring, by a display screen, gesture information on the display screen, wherein the gesture information is a pattern of a user's touch on the display screen;
   sending the gesture information to the processor;
   in response to determining by the processor that the gesture information matches preset gesture information, acquiring position change information corresponding to the gesture information, wherein the position change information is a change of touch position of the pattern;
   in response to determining by the processor that the position change information matches preset position change information, dividing a display region of the display screen into at least two sub-regions during the pattern of the user's touch on the display screen; and
   displaying a currently displayed first display interface in a first sub-region of the at least two sub-regions;
   wherein the preset gesture information matches a three-point touch, and the preset position change information matches an upward sliding motion.

9. The electronic device according to claim 8, wherein the step of acquiring gesture information on a display screen comprises:
  acquiring a click touch operation of a user on the display screen;
  analyzing the click touch operation to determine point touch data corresponding to the click touch operation; and
  generating the gesture information according to the touch data.

10. The electronic device according to claim 9, wherein the acquiring a click touch operation of a user on the display screen comprises:
  acquiring, by an electrode in the display screen, the click touch operation of the user; and
  when the display screen acquires the touch operation through the electrode, analyzing, by the processor, a current magnitude of each point, and determining position coordinate information of each point.

11. The electronic device according to claim 10, wherein the analyzing the click touch operation to determine point touch data corresponding to the click touch operation comprises:
  determine point touch data corresponding to the click touch operation according to the position coordinate information of each point.

12. The electronic device according to claim 8, wherein the step of acquiring position change information corresponding to the gesture information comprises:
  acquiring a sliding touch operation of a user on the display screen;
  analyzing the sliding touch operation to determine sliding touch data corresponding to the sliding touch operation; and
  generating the position change information according to the sliding touch data.

13. The electronic device according to claim 12, wherein the step of dividing a display region of the display screen into at least two sub-regions comprises:
  determining whether a sliding motion indicated by the sliding touch data in the position change information matches the upward sliding motion; and
  when it is determined that the sliding motion indicated by the sliding touch data in the position change information matches the upward sliding motion, determining that the position change information is the preset position change information and performing the step of dividing a display region of the display screen into at least two sub-regions.

14. The electronic device according to claim 13, wherein the step of displaying a currently displayed first display interface in a first sub-region of the at least two sub-regions comprises:
  displaying the first display interface in the first sub-region;
  displaying an icon or a thumbnail of at least one application according to a usage frequency in an order from high to low; and
  when a selection instruction of the icon by the user is received, displaying a second display interface of the application corresponding to the selected icon in a second sub-region of the at least two sub-regions.

15. A computer readable storage medium having a computer program stored thereon, wherein the program is executed by a processor to implement a method of processing the split screen display comprising:
  acquiring, by a display screen, gesture information on the display screen, wherein the gesture information is a pattern of a user's touch on the display screen;
  sending the gesture information to a processor of an electronic device;
  in response to determining by the processor that the gesture information matches preset gesture information, acquiring position change information corresponding to the gesture information, wherein the position change information is a change of touch position of the pattern;
  in response to determining by the processor that the position change information matches preset position change information, dividing a display region of the display screen into at least two sub-regions during the pattern of the user's touch on the display screen; and
  displaying a currently displayed first display interface in a first sub-region of the at least two sub-regions;
  wherein the preset gesture information matches a three-point touch, and the preset position change information matches an upward sliding motion.

16. The computer readable storage medium according to claim 15, wherein the step of acquiring gesture information on a display screen comprises:
  acquiring a click touch operation of a user on the display screen;
  analyzing the click touch operation to determine point touch data corresponding to the click touch operation; and
  generating the gesture information according to the touch data.

17. The computer readable storage medium according to claim 16, wherein the acquiring a click touch operation of a user on the display screen comprises:
  acquiring, by an electrode in the display screen, the click touch operation of the user; and
  when the display screen acquires the touch operation through the electrode, analyzing, by the processor, a current magnitude of each point, and determining position coordinate information of each point.

18. The computer readable storage medium according to claim 15, wherein the step of acquiring position change information corresponding to the gesture information comprises:
  acquiring a sliding touch operation of a user on the display screen;
  analyzing the sliding touch operation to determine sliding touch data corresponding to the sliding touch operation; and
  generating the position change information according to the sliding touch data.

* * * * *